(12) United States Patent
Komai

(10) Patent No.: US 7,086,626 B2
(45) Date of Patent: Aug. 8, 2006

(54) TAPE CUTTING-OUT EQUIPMENT AND TAPE PRODUCTION SUPPORTING APPARATUS

(75) Inventor: Hirokazu Komai, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/687,609

(22) Filed: Oct. 20, 2003

(65) Prior Publication Data

US 2004/0079832 A1    Apr. 29, 2004

(30) Foreign Application Priority Data

Oct. 22, 2002    (JP)    ............................. 2002-307122

(51) Int. Cl.
*B65H 35/04*    (2006.01)
*B26D 5/00*    (2006.01)

(52) U.S. Cl. .................. 242/523.1; 83/76.8; 242/534.2
(58) Field of Classification Search ............. 242/523.1, 242/534, 534.2; 360/31; 700/126, 167, 700/171; 29/806; 83/75.5, 76.8, 371; 209/552, 209/567, 569

See application file for complete search history.

(56) References Cited

U.S. PATENT DOCUMENTS

| | | | | |
|---|---|---|---|---|
| 3,319,055 | A | * | 5/1967 | Pavlenko et al. ........... 700/171 |
| 3,569,683 | A | * | 3/1971 | Pugh .......................... 708/100 |
| 4,017,976 | A | * | 4/1977 | Barr et al. ..................... 33/1 S |
| 4,894,733 | A | * | 1/1990 | Odaka .......................... 360/31 |
| 5,444,635 | A | * | 8/1995 | Blaine et al. ................ 700/171 |
| 6,317,951 | B1 | * | 11/2001 | Karaki et al. ............ 29/402.01 |

FOREIGN PATENT DOCUMENTS

JP    07-037362 A    2/1995

* cited by examiner

*Primary Examiner*—William A. Rivera
*Assistant Examiner*—Scott Haugland
(74) *Attorney, Agent, or Firm*—Sughrue Mion, PLLC (57) ABSTRACT

Tape cutting-out equipment to wind and cut out tape supplied from a pancake in plural kinds of winding lengths on a reel, the equipment is equipped with a tape supplying device supplying tape from the pancake P, a tape winding device winding the supplied tape from the tape supplying device, a memory unit memorizing position data of defect portions of the tape in the pancake, a winding length deciding unit deciding a winding length of the tape based on the position data read out from the memory unit, a cutting device cutting the tape, and a cutting control unit controlling making the cutting device cut the tape at a timing when the tape winding device winds tape of the winding length decided by the winding length deciding unit.

3 Claims, 6 Drawing Sheets

TAPE CUTTING-OUT EQUIPMENT AND TAPE PRODUCTION SUPPORTING APPARATUS

FIELD OF THE INVENTION

The present invention relates to tape cutting-out equipment and a tape production supporting apparatus so as to lessen a waste portion.

BACKGROUND OF THE INVENTION

Generally, in a manufacturing process of a magnetic tape, it is known that defects occur in the magnetic tape due to magnetic liquid of a state mixed with foreign matters such as dust being coated on a supporting body (base tape), not being locally coated because of defects of the supporting body itself, and the like.

Moreover, in a magnetic tape for high-density recording, a servo signal is written by a servo writer and defects also occur in the magnetic tape due to a writing error of the servo signal.

In a portion with such the defects, because data cannot be recorded/reproduced, a magnetic tape including a defect portion needs to be eliminated.

For an eliminating method, there is a following one.

There exists a method that a magnetic tape wound in a pancake, after a servo signal being written by a servo writer, is wound by a winding device on a product reel, so when errors exist inspecting a servo signal writing error of the magnetic tape in winding by the winding device, products together with a reel is scrapped as a product reel with defect portions.

On the other hand, there exists another method that memorizing positions with defects in a pancake in advance, when there exists no defect within a predetermined length in winding on a reel, wind the length as it is, and when there exists a defect, control to wind tape till a portion with the defect on a reject reel and scrap a magnetic tape wound on the reject reel (for example, see pages 3 and 4, and FIG. 1 in Japan patent laid open publication 7-37362).

However, there exists a problem that to scrap tape having defects in a part together with a reel on which hundreds of meters of the tape with the defects in a part are wound results in scrapping a portion of a magnetic tape which can be effectively utilized and there is a considerably large amount of waste.

When a production plan is such a one to cut out a single length of tape from a pancake, the above waste is inevitable, however when cutting out different lengths of tape, there should exist a combination of a cutting-out method with less waste.

SUMMARY OF THE INVENTION

The present invention is embodied considering the above mentioned problem, and an exemplary object of the invention is to provide tape cutting-out equipment and a tape production supporting apparatus which can lessen a waste portion with eliminating a defect portion of a magnetic tape.

The invention is composed to solve the problem, and firstly, tape cutting-out equipment of the invention is equipment which winds and cuts out tape supplied from a pancake at plural kinds of lengths and is characterized by being equipped with a tape supplying device supplying tape from a pancake, a tape winding device winding the tape supplied from the pancake on a reel, a memory unit memorizing position data of tape defect portions in the pancake, a winding length deciding unit deciding a tape winding length based on position data read from the memory unit, a cutting device cutting the tape, and a cutting control unit making the cutting device cut the tape when the tape winding device has wound a decided winding length of tape decided by the winding length deciding unit.

The tape cutting-out equipment of the invention enables a waste portion to be lessened by cutting out the tape with eliminating the tape defect portions because the winding length deciding unit decides a cutting length of the tape based on the position data of the tape defect portions.

In addition, in the tape cutting-out equipment, the winding length deciding unit can also be composed so as to determine based on the position data read from the memory unit whether or not a defect portion exists within one kind of winding length: when it is judged that no defect portion exists, the one kind of winding length is decided as a winding length next wound; and when judged that a defect portion exists, a winding length is decided by determining whether or not a defect portion exists within a shorter other kind of winding length.

Moreover, in the tape cutting-out equipment, the winding length deciding unit can also be composed so as to calculate combinations of winding lengths by which tape can be wound without including a defect portion and with the least waste from one pancake, based on the position data read from the memory unit, and to decide a winding length.

Thus, the winding length deciding unit can calculate the combinations of the winding lengths by which tape can be wound with the least waste. Therefore, tape can be cut with a combination of winding lengths restraining waste minimum.

Next, a tape production supporting apparatus of the invention is the apparatus which cuts out tape from a pancake without waste and is characterized by having an input unit setting plural kinds of winding lengths scheduled to be produced in a production plan of the day, a memory unit memorizing position data of defect portions of tape in a pancake, a computing unit calculating combinations of winding lengths by which tape can be wound with the least waste and without including a defect portion from one pancake based on position data read from the memory unit, a ratio computing unit obtaining a ratio of tape which is usable from the pancake based on the combinations of the winding lengths calculated by the computing unit, and an output unit outputting judgement results of the ratio computing unit.

According to the tape production supporting apparatus of the invention, the computing unit calculates the combinations of the winding lengths which can be wound without including a defect portion and with the least waste from plural kinds of winding lengths matching the production plan of the day and the ratio computing unit obtains the ratio of the tape which is usable from the pancake based on the combinations of the winding lengths. Then, the output unit outputs the judgement results, so when a manager watches the results and judges that many waste portions exist in case of using the pancake in production of the day, the pancake can be arranged for production in a later day, whereby an effective utilization of the tape can be achieved.

DESCRIPTION OF THE PREFERRED EMBODIMENTS a. First Embodiment

Hereinafter, a first embodiment of the present invention will be described in detail, referring to drawings as needed. Meanwhile, it is assumed that a magnetic tape is applied to the first embodiment.

Figure 1:
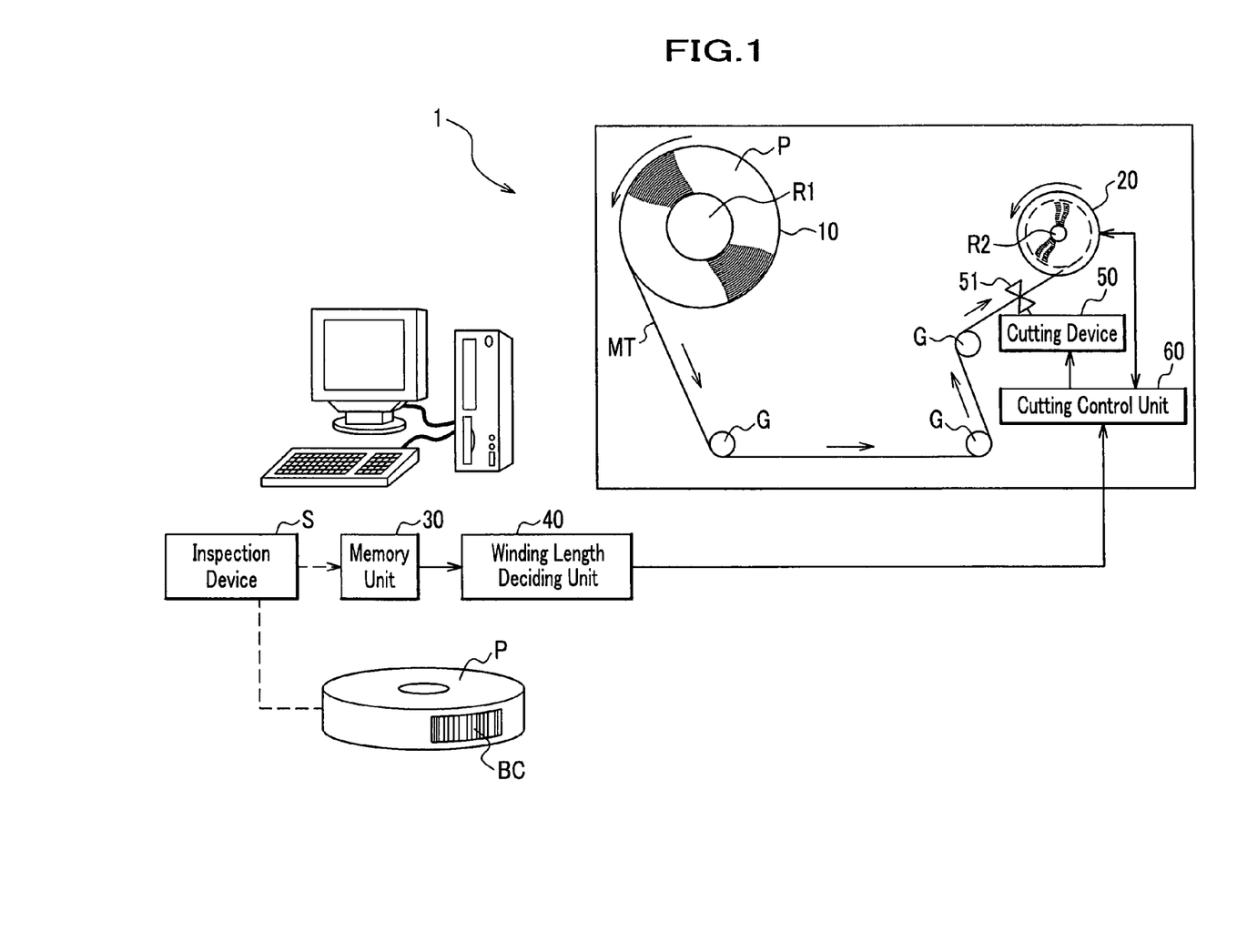
FIG. 1 is a block diagram showing a configuration of tape cutting-out equipment related to a first embodiment of the invention.

As shown in FIG. 1, the tape cutting-out equipment 1 related to the first embodiment is composed of a tape supplying device 10 supplying a magnetic tape MT from a pancake P, a tape winding device 20 winding the supplied magnetic tape MT, a memory unit 30 memorizing position data of defect portions of the magnetic tape MT in the pancake P, a winding length deciding unit 40 deciding a winding length of the magnetic tape MT, a cutting device 50 disposed between the tape supplying device 10 and tape winding device 20, and a cutting control unit 60 controlling the cutting device 50.

The tape supplying device 10 in which the pancake P wound on a reel R1 is inserted is the device to supply the tape winding device 20 with the magnetic tape MT from the pancake P. The reel R1 is rotated by a motor not shown in the drawing at a predetermined rotation number and sends out the magnetic tape MT wound on a circumference at a predetermined speed toward the tape winding device 20.

The tape winding device 20 is the device to wind the magnetic tape MT supplied from the tape supplying device 10 on a reel R2. The reel R2 of the winding device 20 is rotated by a motor not shown in the drawing at a predetermined rotation number and winds the magnetic tape MT at a predetermined speed on its circumference. Meanwhile, plural guide rollers G are provided between the supplying device 10 and winding device 20, and being guided by the guide rollers G, the tape MT is wound on the winding device 20 The memory unit 30 memorizes the position data of defect portions of the magnetic tape MT in the pancake P.

In the magnetic tape MT supplied from the pancake P, before the pancake P is inserted in the tape supplying device 10, servo signals are written in advance by a servo writer not shown in the drawing and presence or absence of defects of servo signals is judged by an inspection device S equipped with the servo writer. In each pancake, making correspondence between a number specifying a pancake and defect positions in it, they are recorded in a barcode label BC and the like appended to a top end portion of the tape MT. Then, the cutting-out equipment 1 memorizes a pancake number and defect positions read from the barcode label BC in the memory unit 30. Meanwhile, although, as defects of the tape MT, those of the servo signals are exemplified here, the defects are not limited to those of the servo signals and the present invention is similarly applicable to other nonconformities such as a pin hole due to peeling-off of a magnetic layer, surface accuracy, and width or linearity of the tape MT.

The winding length deciding unit 40 decides, based on the position data of defect portions in the pancake P, a winding length of the tape MT from plural kinds of winding lengths so as to effectively utilize the tape MT as much as possible. For example, if a defect portion is included in a firstly set winding length, judge whether it is possible to wind a shorter winding length than the set length without including defects and decide the winding length. Meanwhile, plural kinds of winding lengths, for example, assuming a length defined by a specification of each kind of product, are set in different channels, respectively.

The cutting device 50 has a cutter 51 and it cuts the tape MT.

Meanwhile, the cutting control unit 60 makes the cutting device 50 cut the tape MT when the tape winding device 20 has wound a winding length of the tape MT decided by the winding length deciding unit 40.

Figure 2:
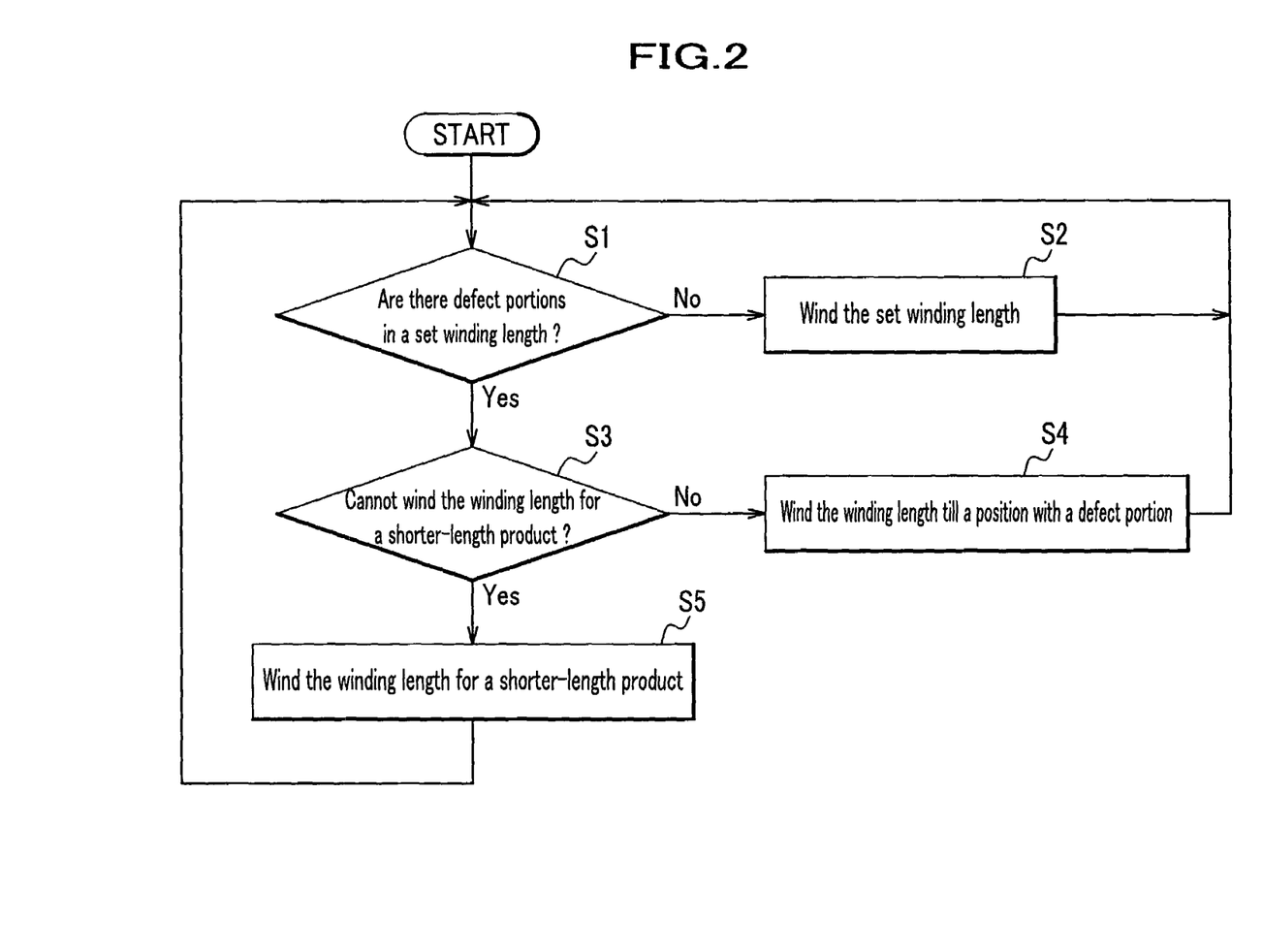
FIG. 2 is a flowchart illustrating a procedure by which a winding length deciding unit decides a winding length.
Figure 3:
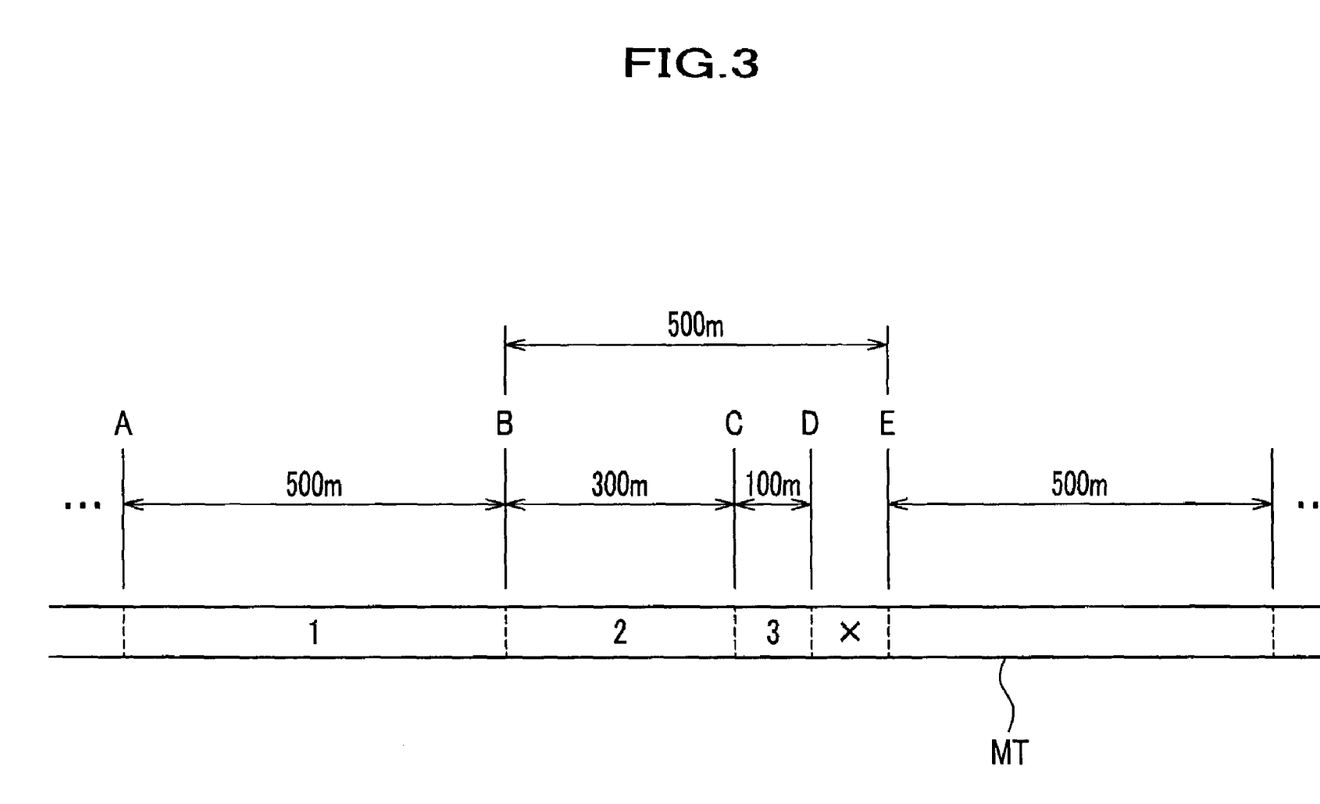
FIG. 3 is a drawing of a magnetic tape illustrating a method to determine a winding length.

Next, referring to FIGS. 2 and 3, operation of the cutting-out equipment 1 related to the first embodiment is described.

Firstly, insert a pancake P of which position data of defect portions memorized in the memory unit 30 in the tape supplying device 10. Then, by reading a barcode BC appended to the pancake P, can specify the pancake P and read the position data of defect portions of the pancake.

For the pancake P inserted in the supplying device 10, the winding length deciding unit 40 decides a winding length from a winding start end A of the tape MT shown in FIG. 3, changing channels, out of plural kinds of winding lengths. Here, for the plural kinds of winding lengths, 500, 400, 300, 200, and 100 m are assumed to exist and 500 m is assumed to be set in advance as a basic winding length.

Operation of the winding length deciding unit 40 is described referring to FIG. 2.

Firstly, in an S1, judge from the winding start end A whether or not a defect portion exists in a winding length of 500 m set in advance. In the S1, if no defect exists in the set winding length of 500 m (No), proceed to an S2 and decide to wind the set winding length (500 m). Then, if defects exist in the set winding length of 500 m (Yes), proceed to an S3 and judge with eliminating defect portions whether to be able to wind remained portions for a shorter-length product. In the S3, in case of judging to be able to wind the remained portions for a shorter-length product (Yes), for example, in case of being able to wind 300 m, proceed to an S5 and decide to wind the remained portions in 300 m. Meanwhile, in the S3, judge whether to be able to wind the remained portions for a shorter-length product till a shortest winding length, so in case of being unable to even wind 300 m, sequentially judge whether to be able to wind 200 m and 100 m. For example, in order not to include a defect portion in a portion starting from a position C in FIG. 3, although 300 and 200 m cannot be wound, 100 m can be wound, thereby decision of winding in 100 m being represented.

In the S3, in case of judging to be unable to wind the remained portions for a shorter-length product (No), that is, in case of including a defect portion in the shortest winding length (100 m) from the next winding start end (D to E in FIG. 3), proceed to an S4 and wind the remained portions on a reject reel and the like so as to include the defect portion.

Then, in the S2, S4, or S5, if a winding length is decided, again repeat the same procedures to decide a next winding length from a finish end portion of its winding length.

Below, referring to FIG. 3, one example of a method for deciding a winding length of a pancake P is described.

Because a first winding (A to B) does not include any defect portion within 500 m from the winding start end A, decide to wind 500 m. Although a second winding (B to C)

includes a defect portion within 500 m from a winding start end B, it does not include any defect portion within 300 m, thereby winding it in 300 m being decided. Although a third winding (C to D) includes a defect portion within 500, 300, and 200 m from a winding start end C, it does not include any defect portion within 100 m, thereby winding it in 100 m being decided. Because a next winding (D to E) includes a defect portion within 100 m of the shortest winding length, decide to wind it till the position so as to include the defect portion. Moreover, according to a flowchart shown in FIG. 2, repeat the same procedures.

Thus, in the tape cutting-out equipment of the first embodiment, following effects can be obtained.

Because the winding length deciding unit 40 decides a cutting length of the magnetic tape MT based on position data of its defect portions, the tape MT is cut out at an effectively utilized length with eliminating the defect portions, thereby a waste portion being able to be lessened.

Although, as described above, the first embodiment is described, the present invention can be practiced in a following embodiment.

For example, in the embodiment, although the decision method of a winding length is decided so as not to include a defect portion by judging whether to be able to be wound for a shorter winding length product, it is also possible to decide a winding length based on position data of defect portions by calculating combinations of winding lengths which can wind tape without including a defect portion and with the least waste from one pancake. Thus, a waste magnetic tape can be made less.

b. Second Embodiment

Next, a second embodiment related to the tape production supporting apparatus will be described referring to FIGS. 4 to 6.

Figure 4:
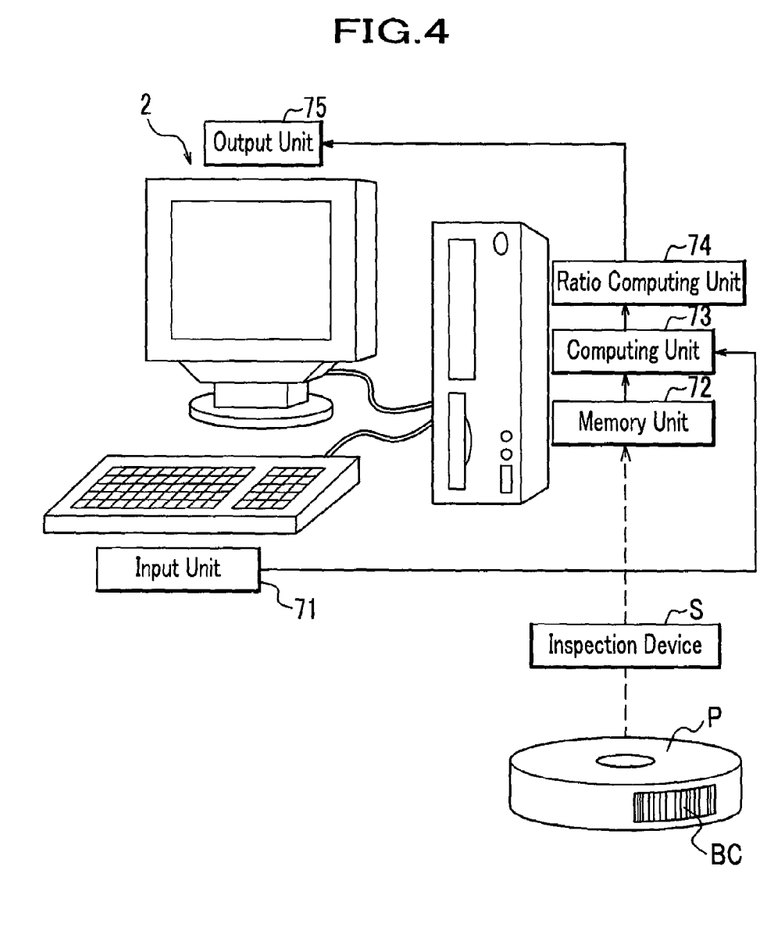
FIG. 4 is a drawing showing a configuration of a tape production supporting apparatus related to a second embodiment of the invention.

As shown in FIG. 4, the tape production supporting apparatus 2 is composed of an input unit 71, a memory unit 72, a computing unit 73, a ratio computing unit 74, and an output unit 75. These can be controlled by one PC.

Firstly, the input unit 71 can set plural kinds of winding lengths scheduled to be produced in a production plan of the day. Here, 500, 300, and 200 m are winding lengths scheduled to be produced on the day.

Then, the memory unit 72 memorizes position data of defect portions of a magnetic tape in one pancake P. A memorizing method similar to that of the memory unit 30 described before is based on the barcode label BC.

The computing unit 73 calculates combinations of winding lengths which can be wound with the least waste, eliminating defect portions, based on the position data of defect portions of the magnetic tape in the memory unit 72 and plural kinds of winding lengths input from the input unit 71.

Moreover, the ratio computing unit 74 obtains a ratio of the magnetic tape usable from the pancake P based on the combinations of the winding lengths calculated by the computing unit 73, and if the ratio is equal or more than a predetermined value, it decides to use the pancake P; whereas if the ratio is less than the predetermined value, it decides not to use the pancake P on the day. Meanwhile, for the usability or not, make the memory unit 72 memorize as usable or not usable information of the pancake P, and then, even when an operator and the like inserts the pancake P in the tape cutting-out equipment by mistake, it is preferable for the cutting-out equipment to be able to control not to cut out it.

The output unit 75 displays judgement results of the ratio computing unit 74.

Figure 5:
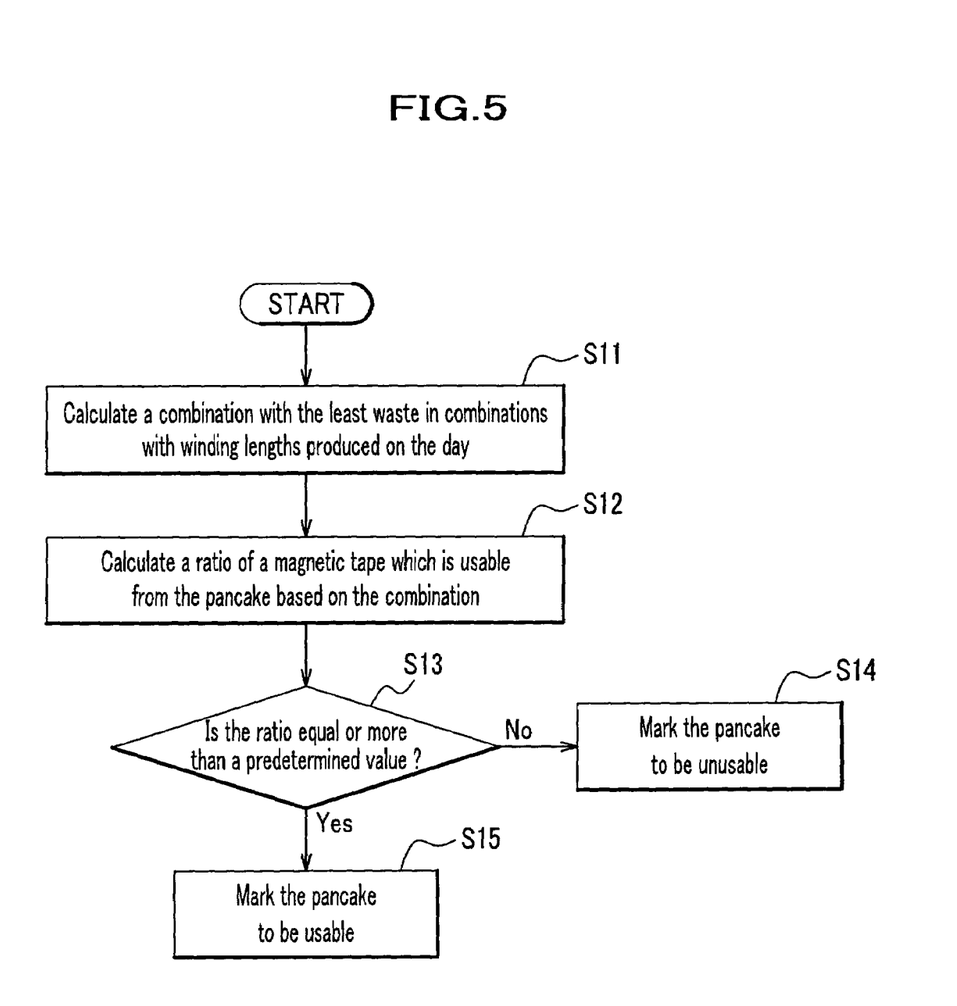
FIG. 5 is a flowchart illustrating an operation procedure of a tape production supporting apparatus.
Figure 6:
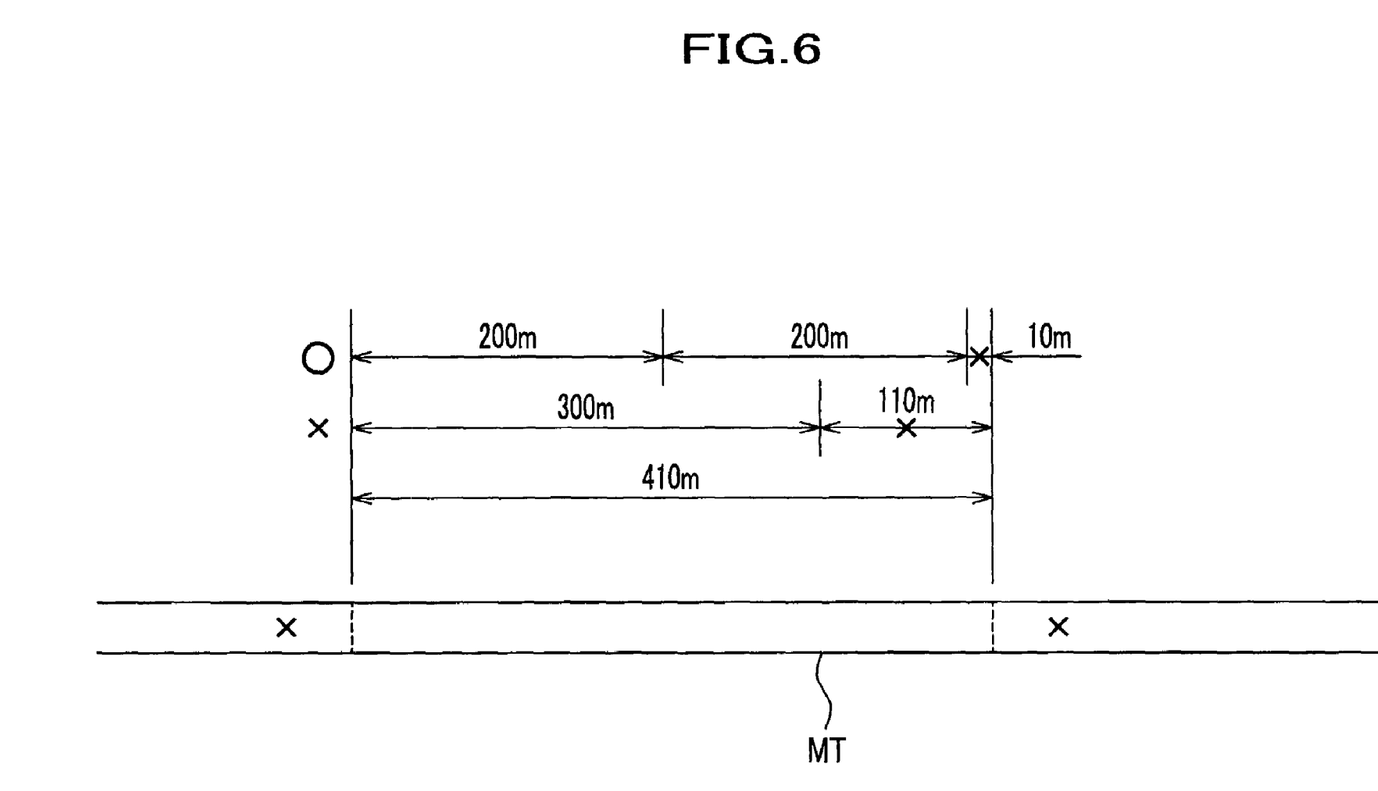
FIG. 6 is a drawing of a magnetic tape illustrating a method to determine a winding length.

Next, referring to FIG. 5, operation procedures of the tape production supporting apparatus 2 are described.

Firstly, in an S11, calculate combinations with the least waste in combinations of winding lengths produced on the day based on information of the barcode label BC of one pancake P. For example, calculate all combinations of winding lengths which become equal or less than a tape length from a defect to defect, compare among windable lengths in each combination calculated, and select a combination windable longest. To be more precise, as shown in FIG. 6, if a distance between two defect portions is 410 m, in a combination of 500, 300, and 200 m, plural kinds can be assumed such as a combination of two pieces of 200 m and a waste portion of 10 m, another combination of one piece of 300 m and a waste portion of 110 m, and the like. In this case, a combination which can most effectively utilize the magnetic tape is the combination of two pieces of 200 m (a waste portion, 10 m), so in the S11, the combination is calculated.

In an S12, calculate a ratio of the magnetic tape usable from the pancake P in the combination calculated in the S11. Then, in an S13, if the ratio is less than a predetermined value (No), proceed to an S14 and record (make marking) usable or not usable information in the memory unit 72 so as to be unable to use the pancake P. In addition, in the S13, if the ratio is equal or more than the predetermined value (Yes), proceed to an S15 and record so as to use the pancake P. Meanwhile, without recording the usable or not usable information, output on a screen whether usable or not and also allow an operator seeing it to finally decide whether usable or not.

Thus, following effects can be obtained.

From plural kinds of winding lengths matching a production plan of the day, the computing unit 73 calculates a combination of winding lengths which can wind tape without including defect portions and with the least waste. Then, the ratio computing unit 74 obtains a ratio of the tape which is usable from the pancake P based on the combinations of the winding lengths and if the ratio is equal or more than a predetermined value, the ratio computing unit 74 decides to use the pancake P; whereas if the ratio is less than the predetermined value, the ratio computing unit 74 decides not to use the pancake P on the day. The judgement results are displayed by the output unit 75, so in production of the day, the pancake P may be used or not, whereby effective utilization of a magnetic tape can be achieved.

Meanwhile, the predetermined value can be easily changed in design by making a manager and the like be able to change the value as needed.

Thus, although the embodiments are described, the invention is not limited to these and these are changeable in design as needed as far as these do not deviate from the ideas of the invention.

For example, in the embodiments, although the ratio computing unit 74 decides to use the pancake P in case of the ratio being equal or more than the predetermined value, a ratio computing unit only calculates a ratio and makes an output unit display it, thereby also being able to make a manager and the like judge whether or not to use the pancake P. Thus, an optimal judgement can be made as appropriate.

Moreover, in the embodiments, although a magnetic tape is used, an optical recording tape is also available.

What is claimed is:

1. A tape cutting method to cut out tape from a pancake, the method comprising the steps of:

calculating combinations of winding lengths of a tape which can be wound without including defect portions and with the least waste from a pancake, wherein said calculations are based on a plurality of winding lengths set in advance and position data of said defect portions of said tape in said pancake recorded in advance;

calculating a ratio of usable tape from said pancake based on the combinations of the winding lengths calculated by said calculation step;

deciding whether or not the pancake is usable based on said ratio calculating step, and cutting unusable tape from the pancake when the pancake is determined to be usable.

2. The tape cutting-out method according to claim 1, wherein said tape is a magnetic tape.

3. The tape cutting-out method according to claim 1, wherein said tape is an optical recording tape.

* * * * *